United States Patent
Ko et al.

(10) Patent No.: US 12,438,228 B2
(45) Date of Patent: Oct. 7, 2025

(54) BATTERY CELL, BATTERY PACK, AND VEHICLE INCLUDING SAME

(71) Applicant: LG Energy Solution, Ltd., Seoul (KR)

(72) Inventors: Kwang-Hun Ko, Daejeon (KR); Su-Ji Choi, Daejeon (KR); Do-Gyun Kim, Daejeon (KR); Da-Som Lee, Daejeon (KR); Kwang-Su Hwangbo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/872,040

(22) PCT Filed: Nov. 22, 2023

(86) PCT No.: PCT/KR2023/018929
§ 371 (c)(1),
(2) Date: Dec. 5, 2024

(87) PCT Pub. No.: WO2024/112110
PCT Pub. Date: May 30, 2024

(65) Prior Publication Data
US 2025/0167381 A1 May 22, 2025

(30) Foreign Application Priority Data
Nov. 22, 2022 (KR) .................. 10-2022-0157708

(51) Int. Cl.
*H01M 50/342* (2021.01)
*H01M 50/152* (2021.01)

(52) U.S. Cl.
CPC ..... *H01M 50/3425* (2021.01); *H01M 50/152* (2021.01); *H01M 2200/20* (2013.01); *H01M 2220/20* (2013.01)

(58) Field of Classification Search
CPC .......... H01M 50/3425; H01M 50/152; H01M 50/15; H01M 50/30
See application file for complete search history.

(56) References Cited

U.S. PATENT DOCUMENTS

2005/0181272 A1* 8/2005 Kim .................. H01M 50/3425
429/185
2010/0136388 A1 6/2010 Kim et al.
(Continued)

FOREIGN PATENT DOCUMENTS

CN 107221624 B 11/2021
CN 114824413 A 7/2022
(Continued)

OTHER PUBLICATIONS

International Search Report for Application No. PCT/KR2023/018929 mailed Mar. 18, 2024, pp. 1-5.
(Continued)

*Primary Examiner* — Kenneth J Douyette
(74) *Attorney, Agent, or Firm* — Lerner David LLP

(57) ABSTRACT

A battery cell according to an embodiment of the present disclosure includes an electrode assembly including a first electrode, a second electrode, and a separator interposed therebetween, a battery housing configured to receive the electrode assembly through an opening formed on one side thereof, and a housing cover configured to cover the opening and having a venting portion configured to break when internal pressure of the battery housing increases to a predetermined level or more, wherein the venting portion includes an upper notched portion provided on the upper surface of the housing cover and a lower notched portion provided on the lower surface of the housing cover, and wherein the upper notched portion and the lower notched portion are provided in a staggered state.

14 Claims, 8 Drawing Sheets

(56) References Cited

U.S. PATENT DOCUMENTS

| | | | |
|---|---|---|---|
| 2011/0086264 A1 | 4/2011 | Tsukamoto et al. | |
| 2014/0045009 A1 | 2/2014 | Kim | |
| 2017/0279098 A1 | 9/2017 | Lee | |
| 2018/0053974 A1* | 2/2018 | Lee | H01M 50/147 |
| 2022/0231345 A1 | 7/2022 | Hwangbo et al. | |
| 2023/0231262 A1 | 7/2023 | Choi et al. | |
| 2024/0021951 A1 | 1/2024 | Kim et al. | |

FOREIGN PATENT DOCUMENTS

| | | |
|---|---|---|
| JP | H10162798 A | 6/1998 |
| JP | 5018856 B2 | 9/2012 |
| JP | 2015133245 A | 7/2015 |
| KR | 20100062886 A | 6/2010 |
| KR | 102161027 B1 | 9/2020 |
| KR | 20220017864 A | 2/2022 |
| KR | 20220050455 A | 4/2022 |
| KR | 20220105145 A | 7/2022 |
| KR | 20220105147 A | 7/2022 |
| WO | 2022031065 A1 | 2/2022 |

OTHER PUBLICATIONS

Search Report dated May 9, 2025 from the Office Action for Chinese Application No. 202380046485.5 Issued May 12, 2025, pp. 1-2.

* cited by examiner

BATTERY CELL, BATTERY PACK, AND VEHICLE INCLUDING SAME

CROSS-REFERENCE TO RELATED APPLICATIONS

The present application is a national phase entry under 35 U.S.C. § 371 of International Application No. PCT/KR2023/018929, filed on Nov. 22, 2023, which claims priority to Korean Patent Application No. 10-2022-0157708, filed on Nov. 22, 2022, the disclosures of all of which are hereby incorporated by reference herein.

TECHNICAL FIELD

The present disclosure relates to a battery cell, a battery pack, and a vehicle including the same.

BACKGROUND ART

Secondary batteries, which are easy to apply depending on the product group and have electrical characteristics such as high energy density and the like, are generally used in electric vehicles (EVs) or hybrid electric vehicles (HEVs) that are driven by an electrical drive source, as well as in portable devices. These secondary batteries are attracting attention as a new energy source for improving eco-friendliness and energy efficiency because they have the primary advantage of being able to dramatically reduce the use of fossil fuels and no by-product is generated due to energy use.

Current secondary batteries widely used include lithium-ion batteries, lithium-polymer batteries, nickel-cadmium batteries, nickel-hydrogen batteries, nickel-zinc batteries, and the like. The operating voltage of this unit secondary battery cell, that is, the unit battery cell, is approximately 2.5V to 4.5V. Therefore, when an output voltage higher than that is required, a battery pack may be configured by connecting a plurality of battery cells in series. In addition, a battery pack may be configured by connecting multiple battery cells in parallel depending on the charge/discharge capacity required for the battery pack. Accordingly, the number of battery cells included in the battery pack may be set in various ways depending on the required output voltage or charge/discharge capacity.

Meanwhile, the battery cell may include a battery can and a cap that covers one face of the battery can. In this case, the cap may have a vent portion formed to prevent an increase in internal pressure caused by gas generated inside the battery can. However, in order to secure a certain level of vent pressure in a conventional battery cell, a large amount of formation is required to make notches, thereby increasing damage to a mold. Therefore, there is a need to reduce the damage to the mold when forming the notches and improve lifespan. In addition, there is a problem with deterioration of productivity due to the large amount of formation when making the notched portion.

DISCLOSURE

Technical Problem

The present disclosure has been designed to solve the problems of the related art, and therefore the present disclosure is intended to efficiently secure vent pressure even with a small amount of notch formation when forming a notch in a vent portion of a battery cell.

Furthermore, the present disclosure is intended to reduce damage to a mold when forming a notch in the vent portion of the battery cell, thereby increasing and improving the lifespan of the battery cell.

According to another aspect, the present disclosure is intended to increase productivity by reducing the amount of notch formation.

However, the technical problems that the present disclosure seeks to solve are not limited to the above-mentioned problems, and other problems not mentioned above will be clearly understood by those skilled in the art from the description of the invention described below.

Technical Solution

According to one aspect of the present disclosure, there is provided a battery cell that includes: an electrode assembly including a first electrode, a second electrode, and a separator interposed therebetween; a battery housing configured to receive the electrode assembly through an opening formed on one side thereof; and a housing cover configured to cover the opening and having a venting portion configured to break when internal pressure of the battery housing increases to a predetermined level or more, wherein the venting portion includes an upper notched portion provided on the upper surface of the housing cover and a lower notched portion provided on the lower surface of the housing cover, and wherein the upper notched portion and the lower notched portion are provided in a staggered state.

Preferably, the venting portion may be configured to form a circular closed loop.

In one aspect of the present disclosure, the center line of the upper notched portion and the center line of the lower notched portion may be spaced a predetermined distance apart from each other in the radial direction.

Preferably, the upper notched portion may be provided more inward than the lower notched portion in the radial direction.

In another aspect of the present disclosure, the upper notched portion and the lower notched portion may be configured such that the widths thereof are reduced as they are closer to the inside of the housing cover from the surface thereof.

In another aspect of the present disclosure, the upper notched portion may have an axisymmetric structure to have an inclination with respect to the center line of the upper notched portion, and the lower notched portion may have an axisymmetric structure to have an inclination with respect to the center line of the lower notched portion.

In one aspect of the present disclosure, a first straight line SL that is a virtual straight line passing through the shortest distance between the upper notched portion and the lower notched portion, and a second straight line that is a virtual straight line perpendicular to the first straight line may be defined in the longitudinal cross-section passing through the center of the housing cover.

In this case, the angle formed between the second straight line and the surface of the housing cover may be greater than 0 degrees and less than 90 degrees.

In one aspect of the present disclosure, assuming that the width of the entrance of the upper notched portion is W1 and that the width of the entrance of the lower notched portion is W2, the distance between the center line of the upper notched portion and the center line of the lower notched portion may satisfy the following Equation 1

$$0 < D2 < \frac{W1 + W2}{2} \qquad \text{Equation 1}$$

In another aspect of the present disclosure, the upper notched portion and the lower notched portion may be configured to be point-symmetrical to each other in the longitudinal cross-section passing through the center of the housing cover.

In another aspect of the present disclosure, in the longitudinal cross-section passing through the center of the housing cover, the shortest distance between the upper notched portion and the lower notched portion may be configured to be greater than the shortest distance between the upper notched portion and the lower notched portion in the case where the upper notched portion and the lower notched portion are provided at the same position in the radial direction.

In another aspect of the present disclosure, in the longitudinal cross-section passing through the center of the housing cover, the shortest distance between the upper notched portion and the lower notched portion may be less than the thickness of the housing cover.

In another aspect of the present disclosure, an area where the upper notched portion is formed and an area where the lower notched portion is formed may be configured to at least partially overlap each other in a direction perpendicular to the housing cover.

In another aspect of the present disclosure, the shortest distance between the upper notched portion and the lower notched portion may be greater than 10% of the thickness of the housing cover.

Meanwhile, the present disclosure provides a battery pack including at least one battery cell according to the embodiments described above.

In addition, the present disclosure provides a vehicle including at least one battery pack according to the embodiment described above.

Advantageous Effects

According to the processor disclosure, it is possible to secure a predetermined level of vent pressure in the battery cell even with a small amount of notch formation.

According to another aspect of the present disclosure, a small amount of notch formation makes it possible to reduce damage to the mold, thereby expecting an increase in the lifespan of the battery cell.

According to another aspect of the present disclosure, it is possible to increase productivity by reducing the amount of notch formation.

However, the effects obtainable from the present disclosure are not limited to the above-mentioned effects, and other effects not mentioned above will be clearly understood by those skilled in the art from the description of the invention described below.

DESCRIPTION OF DRAWINGS

The accompanying drawings illustrate a preferred embodiment of the present disclosure and, together with the detailed description of the invention, serve to provide further understanding of the technical idea of the present disclosure, and thus, the present disclosure is not construed as being limited to the drawings.

BEST MODE

Figure 1:
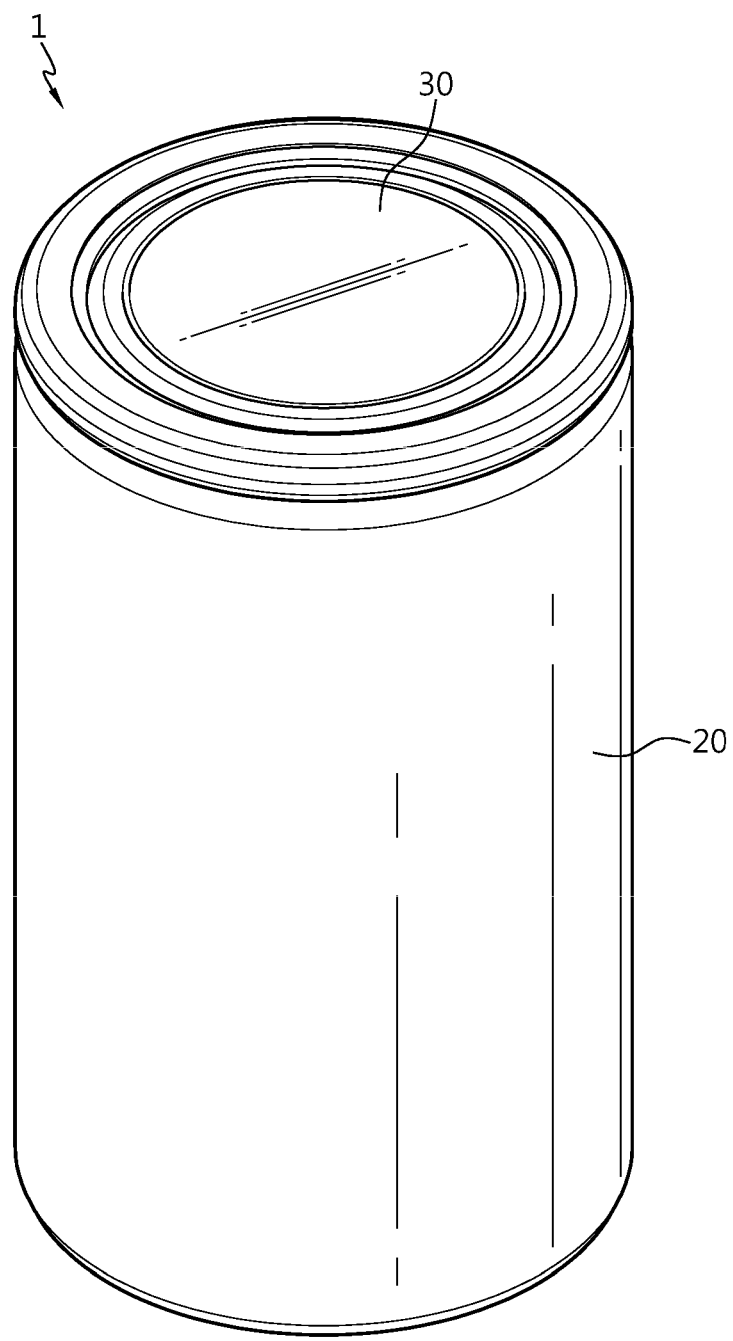
FIG. 1 is a diagram illustrating a battery cell according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the configurations proposed in the embodiments and drawings of this specification indicate only the most preferable embodiment of the present disclosure and do not represent all technical ideas of the present disclosure, so it should be understood that various equivalents and modifications could be made thereto at the time of filing the application.

Additionally, to aid understanding of the present disclosure, the accompanying drawings are not drawn to real scale and the dimensions of some elements may be exaggerated. In addition, the same reference numerals may indicate the same elements between different embodiments.

Stating that two objects to be compared are the same means that they are "substantially the same." Therefore, "substantially the same" may include the case having a deviation that is considered low in the art, for example, a deviation of less than 5%. In addition, a parameter that is uniform in a certain area may indicate that it is uniform from the average perspective.

Although "first," "second," etc. are used to describe various elements, these elements are not limited to these terms. These terms are only used to distinguish one element from another element, and unless otherwise stated, a first element may also be a second element.

Throughout the specification, unless otherwise stated, respective elements may include a single or a plurality of elements.

Configuration in which an element is disposed "in the upper portion or lower portion" or "at the top or bottom" of a target element may indicate that the element may be disposed in contact with the upper surface or lower surface of the target element and that another element may be interposed between the target element and the element disposed at the top or bottom of the target element.

Additionally, the expression "an element is 'connected,' 'coupled,' or 'fastened' to another element" should be understood that the elements may be directly connected or fastened to each other, and that another element may be "interposed" between the elements or that the elements may be "connected," "coupled," or "fastened" through other elements.

Throughout the specification, "A and/or B", unless otherwise stated, may denote A or B or A and B, and "C to D", unless otherwise stated, may denote "equal to or greater than C and equal to or less than D."

For convenience of explanation, in this specification, the longitudinal direction of a winding axis of an electrode assembly 10 wound in a jellyroll shape will be referred to as an "axial direction (Y)". In addition, the direction surrounding the winding axis will be referred to as a "circumferential direction (X)." In addition, the direction approaching or moving away from the winding axis will be referred to as a "radial direction." Among these, the direction approaching the winding axis is called a "centripetal direction," and the direction moving away from the winding axis is called a "centrifugal direction."

Figure 2:
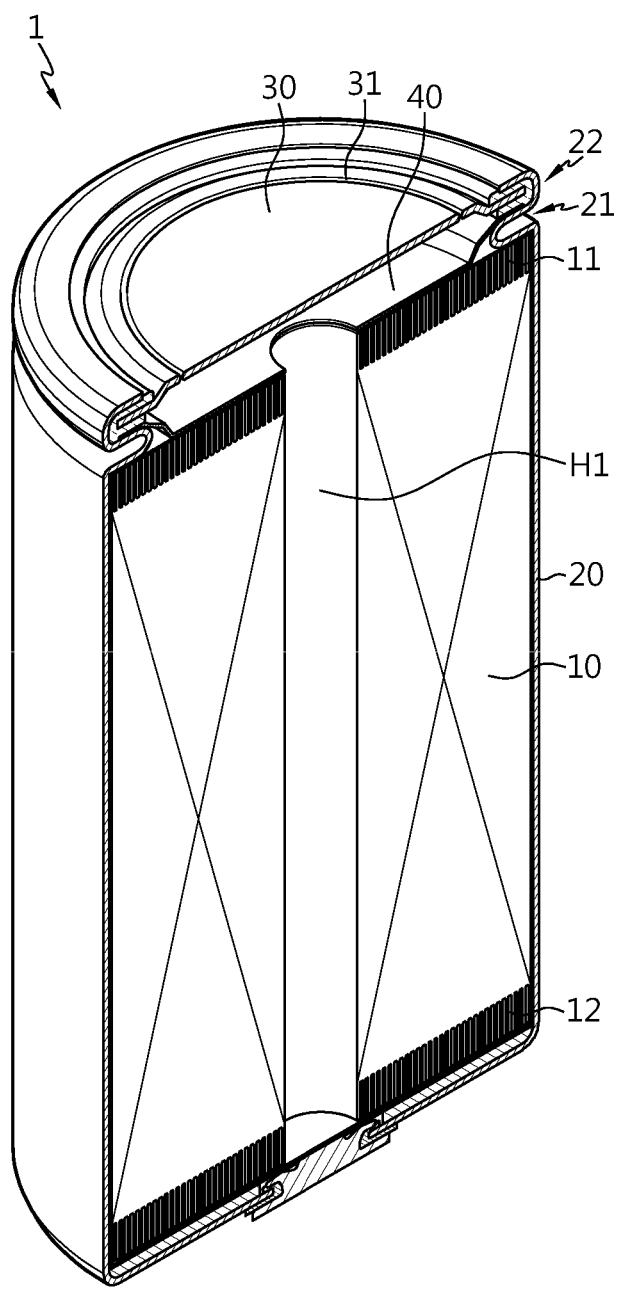
FIG. 2 is a longitudinal cross-sectional and perspective view in FIG. 1.
Figure 3:
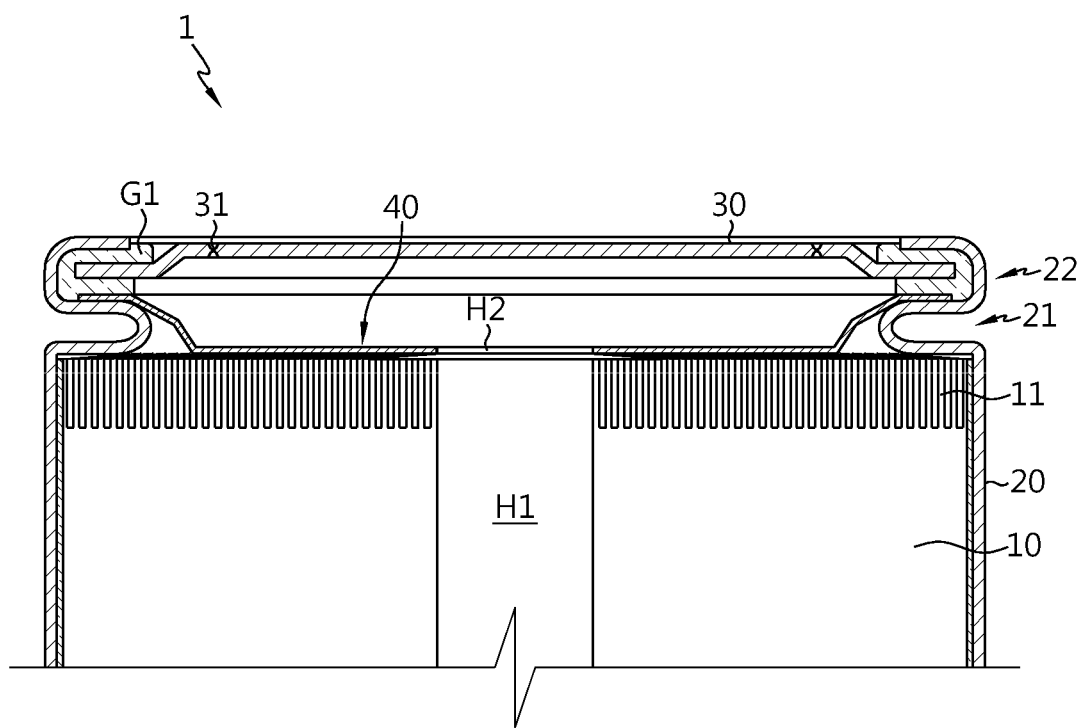
FIG. 3 is a longitudinal cross-sectional view of the battery cell in FIG. 1.

FIG. 1 is a diagram illustrating a battery cell 1 according to an embodiment of the present disclosure, and FIG. 2 is a longitudinal cross-sectional and perspective view in FIG. 1. FIG. 3 is a longitudinal cross-sectional view of the battery cell 1 in FIG. 1.

Referring to FIG. 1, the battery cell 1 according to an embodiment of the present disclosure includes an electrode assembly 10, a battery housing 20, and a housing cover 30. The battery cell 1 may further include a collector 40. The present disclosure is not limited to a specific type of battery, and may be applied to other types of batteries, such as a prismatic battery.

Referring to FIGS. 2 and 3, the electrode assembly 10 includes a first electrode tab 11 and a second electrode tab 12. Specifically, the electrode assembly 10 includes a first electrode, a second electrode, and a separator interposed therebetween. The electrode assembly 10 has a structure in which a first electrode and a second electrode are wound around a winding axis while a separator is interposed therebetween, thereby defining a core and an outer circumferential surface. That is, the electrode assembly 10 applied to the present disclosure may be a jellyroll-type electrode assembly 10. In this case, an additional separator may be provided on the outer circumferential surface of the electrode assembly 10 to insulate the same from the battery housing 20. The electrode assembly 10 may have a winding structure well known in the art without limitations.

Meanwhile, in the present disclosure, any active material known in the art may be used, without limitations, as the positive electrode active material coated on the positive electrode plate and the negative electrode active material coated on the negative electrode plate.

Referring to FIGS. 1 and 2, the battery housing 20 is a substantially cylindrical container having an opening formed on one side thereof, and is made of a conductive metal material. In general, the side face of the battery housing 20 and the bottom face opposite the opening are integrally formed. That is, the battery housing 20 is generally configured such that the top thereof in the height direction is open and the bottom is closed. The bottom face of the battery housing 20 may be configured in a substantially flat shape. The battery housing 20 receives the electrode assembly 10 through the opening formed on one side in the height direction. The battery housing 20 may also receive an electrolyte through the opening.

The battery housing 20 may have a beading portion 21 formed at an end adjacent to the opening provided at the top of the battery housing 20. The battery housing 20 may further include a crimping portion 22 formed on the beading portion 21. The beading portion 21 may be configured such that the outer circumferential surface of the battery housing 20 is press-fitted to a predetermined depth. More specifically, the beading portion 21 may be configured to be press-fitted inward in the area between the opening formed on one side of the battery housing 20 and an accommodation portion that accommodates the electrode assembly 10.

The beading portion 21 is formed above the electrode assembly 10. The inner diameter of the battery housing 20 in the area where the beading portion 21 is formed is smaller than the diameter of the electrode assembly 10.

The beading portion 21 provides a support surface on which the housing cover 40 is seated. In addition, the beading portion 21 may provide a support surface on which at least a portion of the edge of the collector 40 is seated and coupled. That is, at least a portion of the edge of the collector 40 of the present disclosure and/or the edge of the housing cover 30 may be seated on the upper surface of the beading portion 21. In order to stably support at least a portion of the edge of the collector 40 and/or the edge of the housing cover 30, the upper surface of the beading portion 21 may be configured to extend in a direction approximately parallel to the bottom face of the battery housing 20, that is, in a direction approximately perpendicular to the side wall of the battery housing 20.

The beading portion 21 may prevent the electrode assembly 10, which may have a size approximately corresponding to the inner diameter of the battery housing 20, from coming out through the opening formed at the top of the battery housing 20 and serve as a support portion on which the housing cover 30 is seated. The upper beading portion 21 may function as a support portion for fixing the collector 40, a sealing gasket G1, and the like, as well as the housing cover 30.

The crimping portion 22 is formed on the top of the beading portion 21. The crimping portion 22 is configured to extend and bend to surround the edge of the housing cover 30 disposed above the beading portion 21. Such a configuration of the crimping portion 22 may fix the housing cover 30 onto the beading portion 21.

Referring to FIGS. 1 to 3, the housing cover 30 may include a venting portion 31 formed to prevent an increase in internal pressure due to gas generated inside the battery housing 20. The venting portion 31 may be configured to break when the internal pressure of the battery housing 20 increases to a predetermined level or more. For example, the venting portion 31 may be formed in a portion of the housing cover 30, and may be a more vulnerable area in structure than the surrounding area so as to easily break when internal pressure is applied thereto. For example, the venting portion 31 may be an area having a smaller thickness than the surrounding area.

That is, for some reason, a thermal event may occur inside the battery cell 1 to generate venting gas, and the pressure inside the battery housing 20 may increase due to the venting gas. At this time, the venting portion 31, corresponding to the area that is more vulnerable in structure than the surrounding area so as to easily break when the internal pressure of the battery cell 1 increases, may break when the venting gas is generated.

Referring to FIGS. 1 to 3, the housing cover 30 covers the opening formed on one side of the battery housing 20. The housing cover 30 may be fixed by the crimping portion 22 formed at the top of the battery housing 20. In this case, a sealing gasket G1 may be interposed between the battery housing 20 and the housing cover 30 and between the collector 40 and the housing cover 30 to improve the fixing force and the airtightness of the battery housing 20. In this case, a contact portion 33a and/or a second contact portion may be interposed between the beading portion 21 of the battery housing 20 and the sealing gasket G1. The contact portion 33a and/or the second contact portion interposed between the beading portion 21 and the sealing gasket G1 as described above may be fixed by bending the crimping portion 22 extending upwards from the beading portion 21.

Meanwhile, in the present disclosure, the housing cover 30 is not a component that must function as a current path. Therefore, the sealing gasket G1 is not necessarily applied as long as the airtightness of the opening of the battery housing 20 is able to be secured by firmly fixing the battery housing 20 and the housing cover 30 by welding or fixing using other parts.

Figure 4:
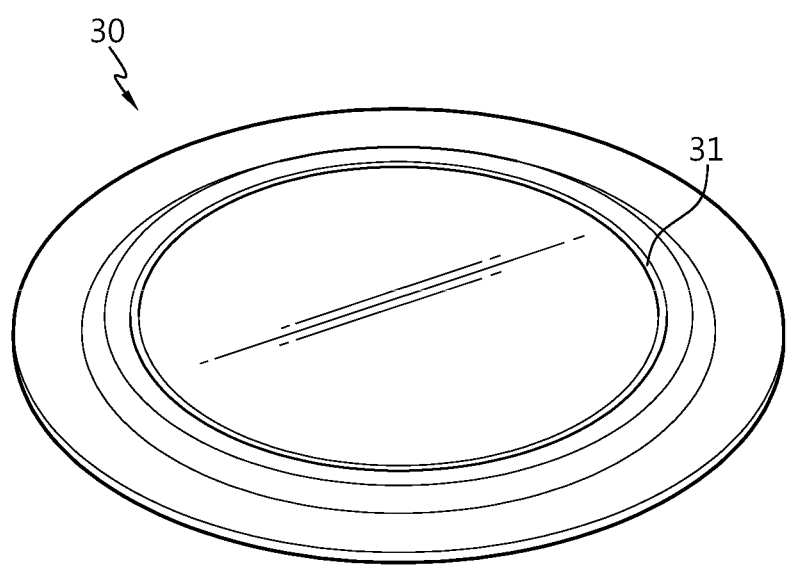
FIG. 4 is a diagram illustrating a housing cover according to an embodiment of the present disclosure.
Figure 5:
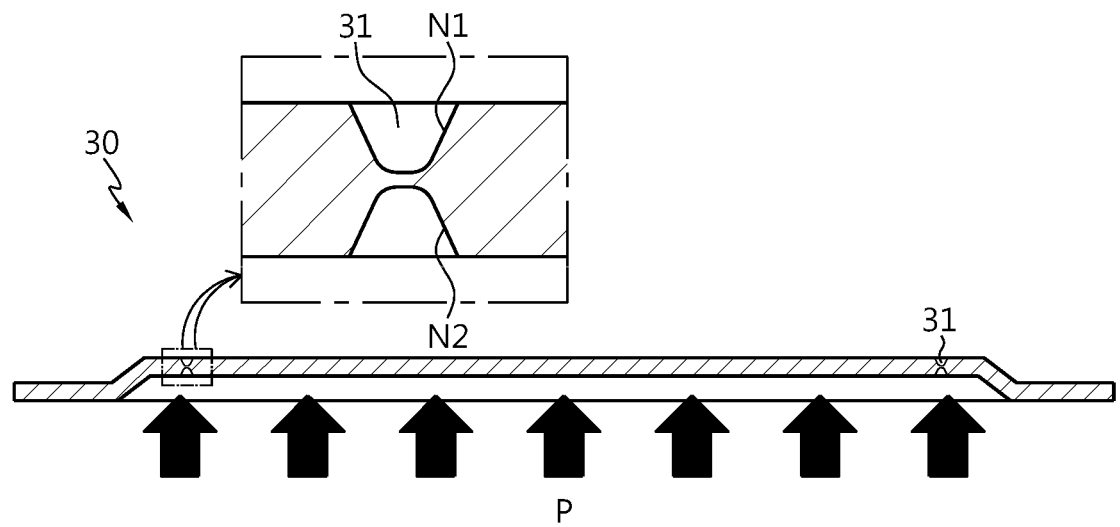
FIG. 5 is a drawing illustrating a housing cover corresponding to a comparative example of the present disclosure.

FIG. 4 is a diagram illustrating a housing cover 30 according to an embodiment of the present disclosure. FIG. 5 is a drawing illustrating a housing cover 30 corresponding to a comparative example of the present disclosure, and FIG. 6 is a diagram illustrating a housing cover 30 according to an embodiment of the present disclosure.

Figure 6:
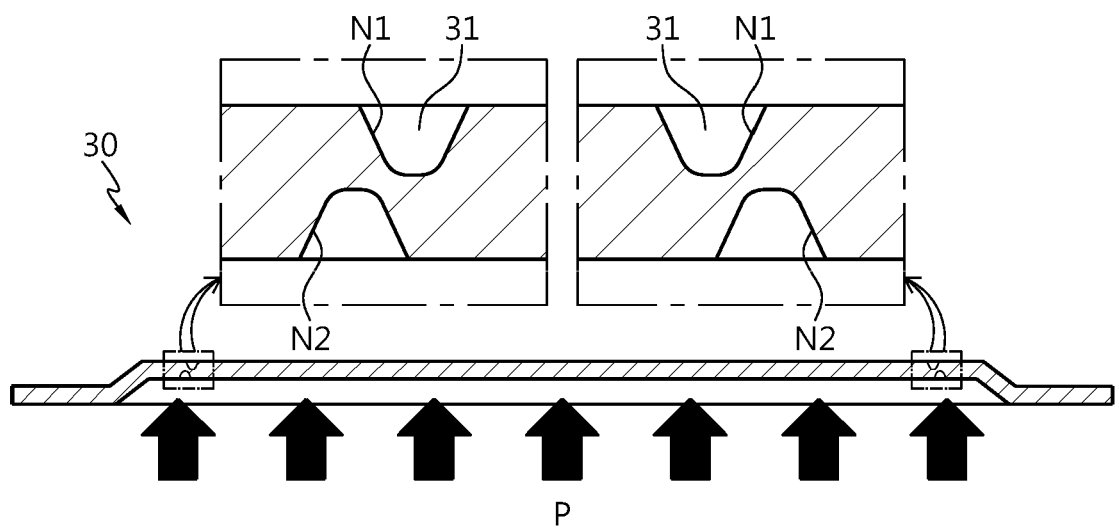
FIG. 6 is a diagram illustrating a housing cover according to an embodiment of the present disclosure.

Referring to FIGS. 4 and 6, the venting portion 31 may include an upper notched portion N1 provided on the upper surface of the housing cover 30 and a lower notched portion N2 provided on the lower surface of the housing cover 30. Here, the upper notched portion N1 and the lower notched portion N2 may be provided in a staggered state.

According to this structure, since the upper notched portion N1 and the lower notched portion N2 are provided in the staggered state, shear stress may be the dominant stress applied to the area between the upper notched portion N1 and the lower notched portion N2.

If the upper notched portion N1 and the lower notched portion N2 are provided on the same line in the conventional housing cover 30 shown in FIG. 5, tensile stress may be the dominant stress applied to the area between the upper notched portion N1 and the lower notched portion N2. In the case where the area between the upper notched portion N1 and the lower notched portion N2 is subjected to the same magnitude of pressure as shown in FIG. 5 or 6, it is more likely to break when shear stress is applied, compared to when tensile stress is applied. Therefore, according to the present disclosure, the venting portion 31 may break even if a lower vent pressure is applied thereto. Alternatively, since the upper notched portion N1 and the lower notched portion N2 are in the staggered state, it may be possible to secure the same vent pressure even with a smaller amount of notch formation. As a result, damage to the mold may be reduced by reducing the amount of formation, thereby expecting an increase in the lifespan of the housing cover 30.

Referring to FIGS. 1 to 4, the venting portion 31 may be configured to form a substantially circular closed loop. Accordingly, if venting gas is ejected from the inside of the battery cell 1 so that internal pressure is applied to the housing cover 30 in the upward direction, the venting portion 31 may break, and the inner area of the circular closed loop of the housing cover 30 may rupture. Accordingly, venting may be easily performed.

Figure 7:
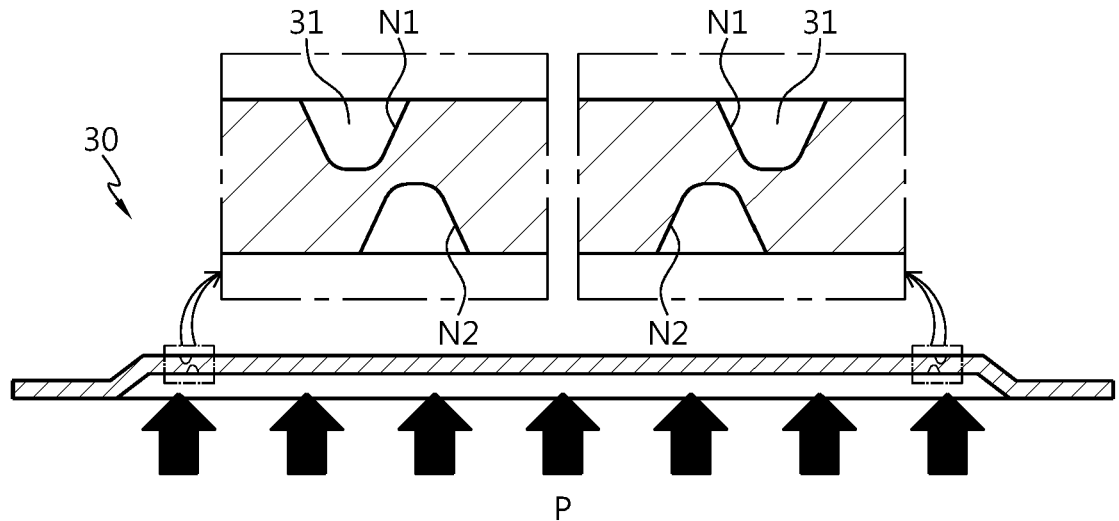
FIG. 7 is a diagram illustrating a housing cover according to another embodiment of the present disclosure.

FIG. 7 is a diagram illustrating a housing cover 30 according to another embodiment of the present disclosure.

In one aspect of the present disclosure, the center line of the upper notched portion N1 and the center line of the lower notched portion N2 may be configured to be spaced a predetermined distance apart from each other in the radial direction. Here, the center line may indicate a line that extends in the height direction of the battery cell 1 and passes through the width-directional center of the notched portion N1 or N2.

For example, referring to FIG. 6, the upper notched portion N1 may be provided more inward than the lower notched portion N2 in the radial direction. As another embodiment of the present disclosure, referring to FIG. 7, the upper notched portion N1 may be provided more outwards than the lower notched portion N2 in the radial direction.

According to the structure configured such that the center line of the upper notched portion N1 and the center line of the lower notched portion N2 are spaced a predetermined distance apart from each other in the radial direction, shear stress may be the dominant stress applied to the area between the upper notched portion N1 and the lower notched portion N2. Therefore, according to the present disclosure, the venting portion 31 may break even if a lower vent pressure is applied thereto. Alternatively, since the upper notched portion N1 and the lower notched portion N2 are in the staggered state, it may be possible to secure the same vent pressure even with a smaller amount of notch formation. As a result, damage to the mold may be reduced by reducing the amount of formation, thereby expecting an increase in the lifespan of the housing cover 30.

In another aspect of the present disclosure, the upper notched portion N1 and the lower notched portion N2 may be configured such that the widths thereof are reduced as they are closer to the inside of the housing cover 30 from the surface thereof.

For example, referring to FIG. 6 or 7, the upper notched portion N1 and the lower notched portion N2 may be configured to have a substantially V-shaped cross-section. Alternatively, in another embodiment, the upper notched portion N1 and the lower notched portion N2 may be configured to have a substantially U-shaped cross-section. That is, the cross-sections of the notched portions N1 and N2 may be configured to have slopes on both sides.

According to this structure, in the case where the center line of the upper notched portion N1 and the center line of the lower notched portion N2 are spaced a predetermined distance apart from each other in the radial direction, shear stress may be the dominant stress applied to the area between the upper notched portion N1 and the lower notched portion N2.

If the notched portions N1 and N2 have a rectangular cross-section, unlike the present disclosure, even if the center line of the upper notched portion N1 and the center line of the lower notched portion N2 are spaced a predetermined distance apart from each other in the radial direction, the area between the upper notched portion N1 and the lower notched portion N2 may have a vertical structure, instead of an inclined structure. As a result, in this state, the shear stress cannot be the dominant stress applied to the area between the upper notched portion N1 and the lower notched portion N2. Accordingly, the vent pressure required for breaking may be bound to increase, compared to the present disclosure.

On the other hand, according to the present disclosure, since the area between the upper notched portion N1 and the lower notched portion N2 has an inclined structure, in the case where the center line of the upper notched portion N1 and the center line of the lower notched portion N2 are spaced a predetermined distance apart from each other in the radial direction, the stress applied to the area between the upper notched portion N1 and the lower notched portion N2 may be the shear stress.

Preferably, referring to FIG. 6 or 7, the upper notched portion N1 may have an axisymmetric structure to have an inclination with respect to the center line of the upper notched portion N1. On the other hand, the lower notched portion N2 may have an axisymmetric structure to have an inclination with respect to the center line of the lower notched portion N2.

According to this structure, since the area between the upper notched portion N1 and the lower notched portion N2 has the inclined structure, in the case where the center line of the upper notched portion N1 and the center line of the lower notched portion N2 are spaced a predetermined distance apart from each other in the radial direction, shear stress may be the dominant stress applied to the area between the upper notched portion N1 and the lower notched portion N2. In addition, since the notched portions N1 and N2 have the axisymmetric structure with respect to the center line, it may be easy to form the notched portions N1 and N2 in the manufacturing process.

Figure 8:
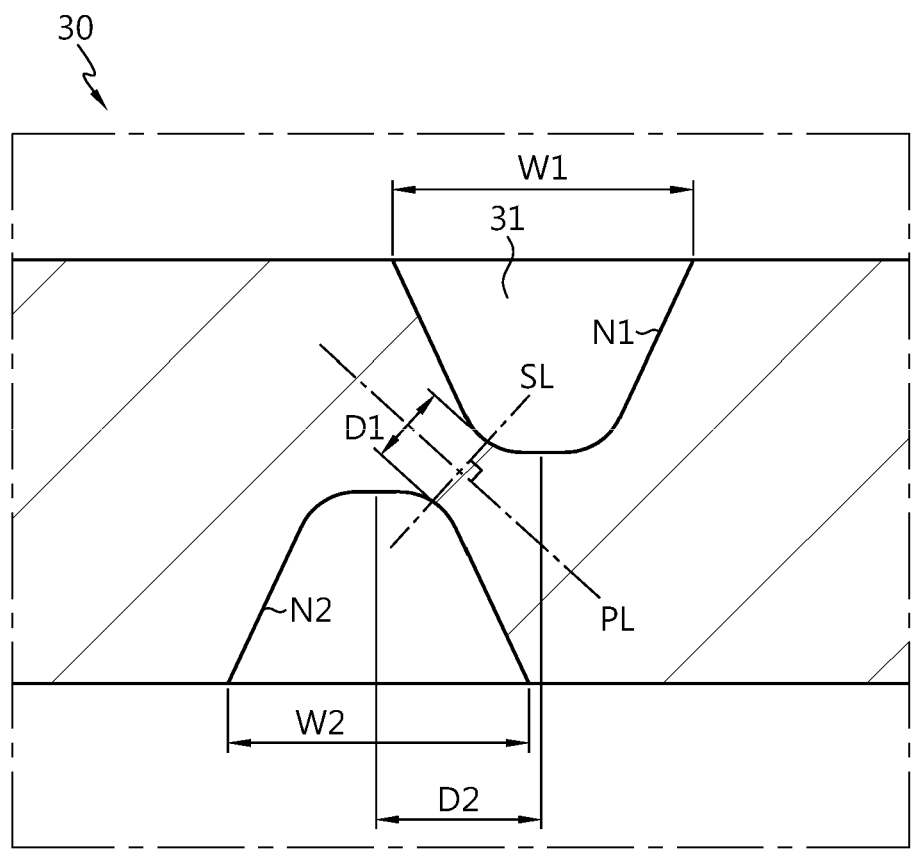
FIG. 8 is a diagram illustrating a venting portion according to an embodiment of the present disclosure.

FIG. 8 is a diagram illustrating a venting portion 31 according to an embodiment of the present disclosure.

Referring to FIG. 8, in the longitudinal cross-section passing through the center of the housing cover 30, a first straight line SL, which is a virtual straight line passing through the shortest distance D1 between the upper notched portion N1 and the lower notched portion N2, and a second straight line PL, which is a virtual straight line perpendicular to the first straight line SL, may be defined.

In this case, according to one aspect of the present disclosure, the angle formed between the second straight line PL and the surface of the housing cover 30 may be greater than 0 degrees and less than 90 degrees.

For example, if the upper notched portion N1 and the lower notched portion N2 are provided on the same line as shown in FIG. 5, the first straight line SL may be perpendicular to the housing cover 30. Accordingly, since the second straight line PL is parallel to the housing cover 30, the angle formed between the second straight line PL and the surface of the housing cover 30 may be 0 degrees. According to this structure, the stress applied to the area between the upper notched portion N1 and the lower notched portion N2 becomes the tensile stress, so that the vent pressure required for breaking of the venting portion 31 may be increased. Although, in order to lower the vent pressure, the thickness of the area between the upper notched portion N1 and the lower notched portion N2 may be reduced by increasing the sizes of the notched portions, this requires a larger amount of formation, thereby increasing the possibility of damaging the mold. Accordingly, the lifespan of the housing cover 30 may be reduced. Therefore, it is preferable that the angle formed between the second straight line PL and the surface of the housing cover 30 is greater than 0 degrees.

On the other hand, if the distance D2 between the center line of the upper notched portion N1 and the center line of the lower notched portion N2 is too long, the first straight line SL may be almost parallel to the surface of the housing cover 30. Accordingly, the angle formed between the second straight line PL and the surface of the housing cover 30 may approach 90 degrees. In this case, the distance D2 between the upper notched portion N1 and the lower notched portion N2 increases excessively to increase the thickness of the area between the upper notched portion N1 and the lower notched portion N2, so that the vent pressure required to break the venting portion 31 may be further increased. Therefore, it is preferable that the angle formed between the second straight line PL and the surface of the housing cover 30 is less than 90 degrees.

Furthermore, it is more preferable that the angle formed between the second straight line PL and the surface of the housing cover 30 is in the range of 30 degrees to 60 degrees. If the angle falls within the range of 30 degrees to 60 degrees, the thickness of the area between the upper notched portion N1 and the lower notched portion N2 may remain at an appropriate level, and at the same time, shear stress may be applied to the area between the upper notched portion N1 and the lower notched portion N2. Accordingly, according to the present embodiment, it may be possible to secure the same vent pressure even with a small amount of notch formation. As a result, damage to the mold may be reduced by reducing the amount of formation, thereby expecting an increase in the lifespan of the housing cover 30.

In another aspect of the present disclosure, referring to FIG. 8, it is preferable that the distance D2 between the center line of the upper notched portion N1 and the center line of the lower notched portion N2 satisfies the following equation.

$$0 < D2 < \frac{W1 + W2}{2} \qquad \text{[Equation 1]}$$

Here, W1 refers to the width of the entrance of the upper notched portion N1, and W2 refers to the width of the entrance of the lower notched portion N2. That is, it is preferable that the distance D2 between the center line of the upper notched portion N1 and the center line of the lower notched portion N2 is less than the average value of the width W1 of the entrance of the upper notched portion N1 and the width W2 of the entrance of the lower notched portion N2, and greater than 0.

If the distance D2 between the center line of the upper notched portion N1 and the center line of the lower notched portion N2 is greater than the average value of the width W1 of the entrance of the upper notched portion N1 and the width W2 of the entrance of the lower notched portion N2, the distance D2 between the upper notched portion N1 and the lower notched portion N2 may increase excessively, thereby increasing the thickness of the area between the upper notched portion N1 and the lower notched portion N2, so the vent pressure required to break the venting portion 31 may be further increased. On the other hand, if the distance D2 between the center line of the upper notched portion N1 and the center line of the lower notched portion N2 is 0, the upper notched portion N1 and the lower notched portion N2 may be positioned on the same line. Accordingly, the dominant force applied to the venting portion 31 may be the tensile stress. As a result, the vent pressure required to break the venting portion 31 may be further increased. Therefore, it may be possible to secure the same vent pressure even with a small amount of notch formation only if the above Equation 1 is satisfied. As a result, damage to the mold may be reduced by reducing the amount of formation, thereby expecting an increase in the lifespan of the housing cover 30.

In another aspect of the present disclosure, the upper notched portion N1 and the lower notched portion N2 may be configured to be point-symmetrical to each other on the longitudinal cross-section passing through the center of the housing cover 30.

Referring to FIG. 8, the upper notched portion N1 and the lower notched portion N2 may be configured to be point-symmetrical to each other on the longitudinal cross-section passing through the center of the housing cover 30, based on the intersection of the first straight line SL and the second straight line PL. That is, the shape of the upper notched portion N1 and the shape of the lower notched portion N2 may be configured to be substantially the same. According to this structure, since the notched portions N1 and N2 have inclined shapes, shear stress may be applied to the area between the upper notched portion N1 and the lower notched portion N2.

In another aspect of the present disclosure, on the longitudinal cross-section passing through the center of the housing cover 30, the shortest distance D1 between the upper notched portion N1 and the lower notched portion N2 may be configured to be greater than the shortest distance D1 between the upper notched portion N1 and the lower notched portion N2 in the case where the upper notched portion N1 and the lower notched portion N2 are provided at the same position in the radial direction.

In the case where the upper notched portion N1 and the lower notched portion N2 are provided on the same line as in FIG. 5, tensile stress may be applied to the area between the upper notched portion N1 and the lower notched portion N2, so that the vent pressure required to break the venting portion 31 may be increased. Accordingly, in this case, in order to lower the vent pressure, the thickness of the area between the upper notched portion N1 and the lower notched portion N2 must be reduced by increasing the sizes of the notched portions. That is, the shortest distance D1 between the upper notched portion N1 and the lower notched portion N2 must be reduced on the longitudinal cross-section passing through the center of the housing cover 30. However, in this case, the amount of formation may increase, thereby increasing the possibility of occurrence of damage to the mold. Accordingly, the lifespan of the housing cover 30 may be reduced.

On the other hand, according to the structure in which the upper notched portion N1 and the lower notched portion N2 are provided in the staggered state as shown in FIG. 8, shear stress may be dominantly applied to the area between the upper notched portion N1 and the lower notched portion N2. Under the same magnitude of pressure, the venting portion is more likely to break when shear stress is applied, compared to when tensile stress is applied, so it is possible to secure the same vent pressure with a smaller amount of notch formation. That is, even if the shortest distance D1 between the upper notched portion N1 and the lower notched portion N2 on the longitudinal cross-section passing through the center of the housing cover 30 is increased more than that in the case in FIG. 5, it may be possible to secure the same vent pressure. As a result, damage to the mold may be reduced by reducing the amount of formation, thereby expecting an increase in the lifespan of the housing cover 30.

In another aspect of the present disclosure, the shortest distance D1 between the upper notched portion N1 and the lower notched portion N2 on the longitudinal cross-section passing through the center of the housing cover 30 may be configured to be less than the thickness of the housing cover 30.

For example, referring to FIG. 8, the shortest distance D1 between the upper notched portion N1 and the lower notched portion N2 may be less than the thickness of the housing cover 30. Furthermore, the shortest distance D1 between the upper notched portion N1 and the lower notched portion N2 may be less than the maximum width of the notched portions N1 and N2.

If the shortest distance D1 between the upper notched portion N1 and the lower notched portion N2 is configured to be too large, the thickness of the area between the upper notched portion N1 and the lower notched portion N2 may increase, so that the vent pressure required to break the venting portion 31 may be further increased. Accordingly, as described above, it is preferable that the shortest distance D1 between the upper notched portion N1 and the lower notched portion N2 is configured to be below or equal to a certain level.

In another aspect of the present disclosure, the area in which the upper notched portion N1 is formed and the area in which the lower notched portion N2 is formed may be configured to at least partially overlap each other in a direction perpendicular to the housing cover 30. For example, referring to FIGS. 6 and 7, the area in which the upper notched portion N1 is formed and the area in which the lower notched portion N2 is formed may be configured to at least partially overlap each other in the direction substantially perpendicular to the housing cover 30, that is, in the upward and downward directions in the drawing. According to this structure, the shortest distance D1 between the upper notched portion N1 and the lower notched portion N2 may be configured within a predetermined range. If the area in which the upper notched portion N1 is formed and the area in which the lower notched portion N2 is formed do not overlap each other along the direction substantially perpendicular to the housing cover 30, the shortest distance D1 between the upper notched portion N1 and the lower notched portion N2 may increase excessively. In that case, the thickness of the area between the upper notched portion N1 and the lower notched portion N2 may increase, thereby further increasing the vent pressure required to break the venting portion 31. Therefore, as described above, it is preferable that the area in which the upper notched portion N1 is formed and the area in which the lower notched portion N2 is formed are configured to at least partially overlap each other along the direction substantially perpendicular to the housing cover 30.

In another aspect of the present disclosure, it is preferable that the shortest distance between the upper notched portion N1 and the lower notched portion N2 is greater than 10% of the thickness of the housing cover 30.

For example, the vent pressure of a battery cell 1 of a specific design that includes a housing cover 30 made of SUS430 and having a thickness of 0.7 t, according to an embodiment of the present disclosure, may be required to reach approximately 17 kgf/cm$^2$. In order to obtain the above vent pressure, the shortest distance D1 between the upper notched portion N1 and the lower notched portion N2 must be approximately 0.070 mm, which corresponds to approximately 10% of the thickness of the housing cover 30. As described above, if the shortest distance D1 between the upper notched portion N1 and the lower notched portion N2 is less than or equal to the above level, the mold is very likely to be damaged during formation, thereby reducing the lifespan of the housing cover 30. Therefore, it is preferable that the shortest distance D1 between the upper notched portion N1 and the lower notched portion N2 is greater than 10% of the thickness of the housing cover 30.

Figure 9:
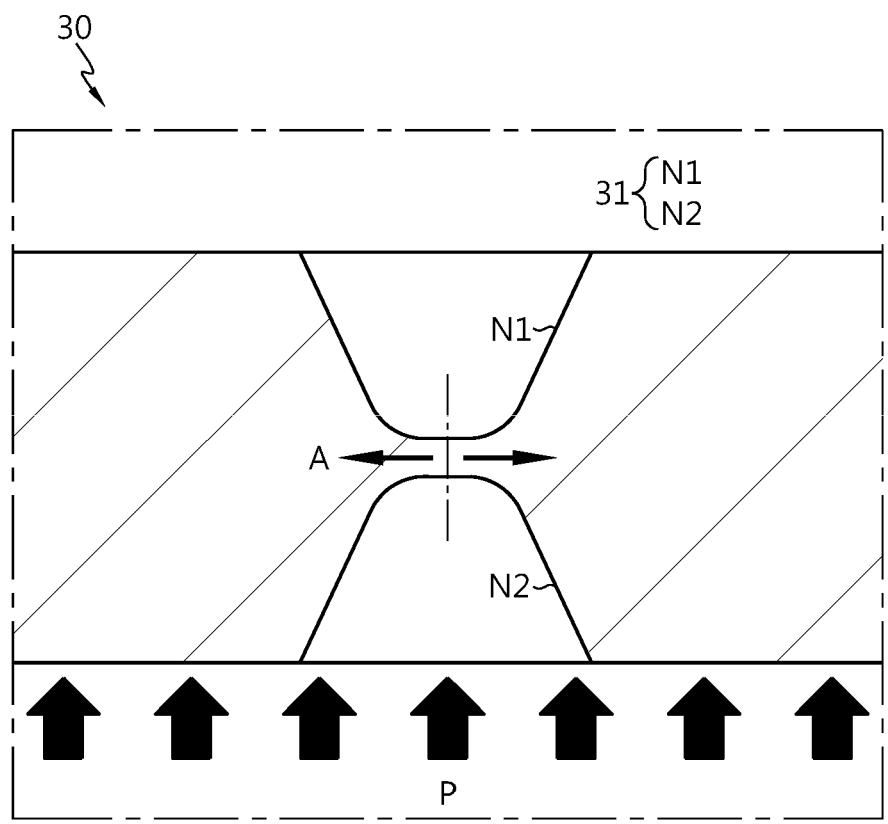
FIG. 9 is a diagram illustrating the breaking process of the venting portion corresponding to a comparative example in the present disclosure.
Figure 10:
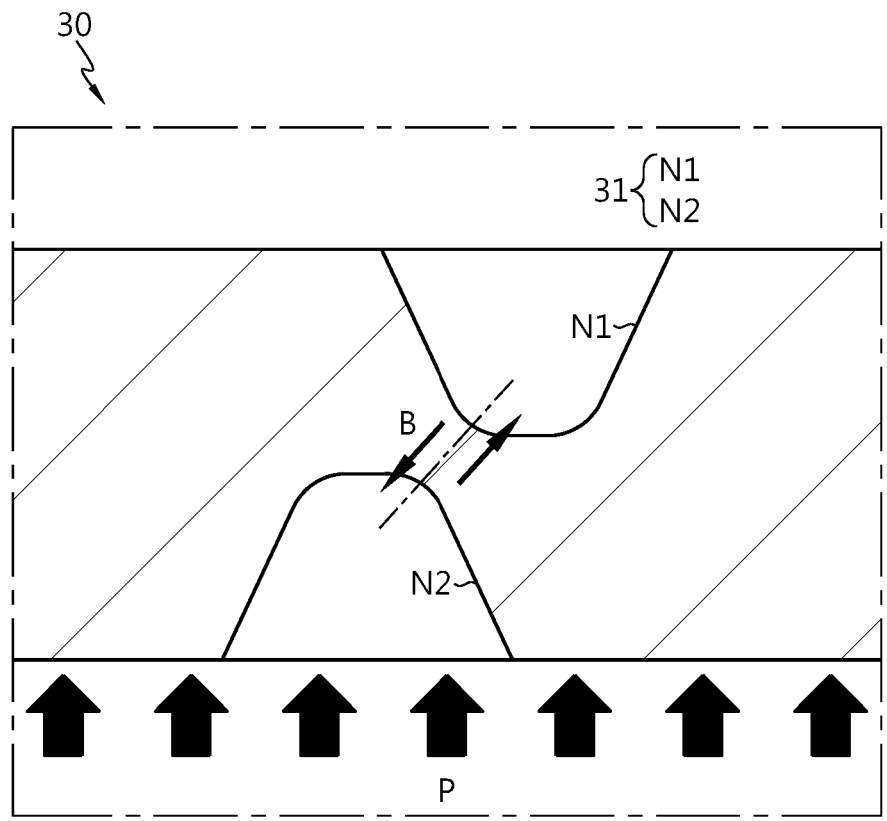
FIG. 10 is a diagram illustrating the breaking process of the venting portion according to an embodiment of the present disclosure.

FIG. 9 is a diagram illustrating the breaking process of the venting portion 31 corresponding to a comparative example in the present disclosure, and FIG. 10 is a diagram illustrating the breaking process of the venting portion 31 according to an embodiment of the present disclosure.

Referring to FIG. 9, in the conventional housing cover 30, the upper notched portion N1 and the lower notched portion N2 may be provided on the same line. In this case, the stress is applied in a direction of arrow A to the area between the upper notched portion N1 and the lower notched portion N2. In this case, the tensile stress may be dominantly applied in the direction A.

On the other hand, referring to FIG. 10, in the housing cover 30 according to an embodiment of the present disclosure, since the upper notched portion N1 and the lower notched portion N2 are provided in the staggered state, the stress is applied in a direction of arrow B to the area between the upper notched portion N1 and the lower notched portion N2. In this case, the shear stress may be dominantly applied in the direction B. Under the same magnitude of pressure, the venting portion is more likely to break when shear stress is applied, compared to when tensile stress is applied. Therefore, according to the present disclosure, the venting portion 31 may break even if a lower vent pressure is applied thereto. Alternatively, as in the present disclosure, if the upper notched portion N1 and the lower notched portion N2 are in the staggered state, it may be possible to secure the same vent pressure even with a smaller amount of notch formation. As a result, damage to the mold may be reduced by reducing the amount of formation, thereby expecting an increase in the lifespan of the housing cover 30.

Referring to FIGS. 1 and 2, the collector 40 according to an embodiment of the present disclosure is accommodated inside the battery housing 20, is electrically connected to the electrode assembly 10, and is also electrically connected to the battery housing 20. That is, the collector 40 electrically connects the electrode assembly 10 and the battery housing 20.

Figure 11:
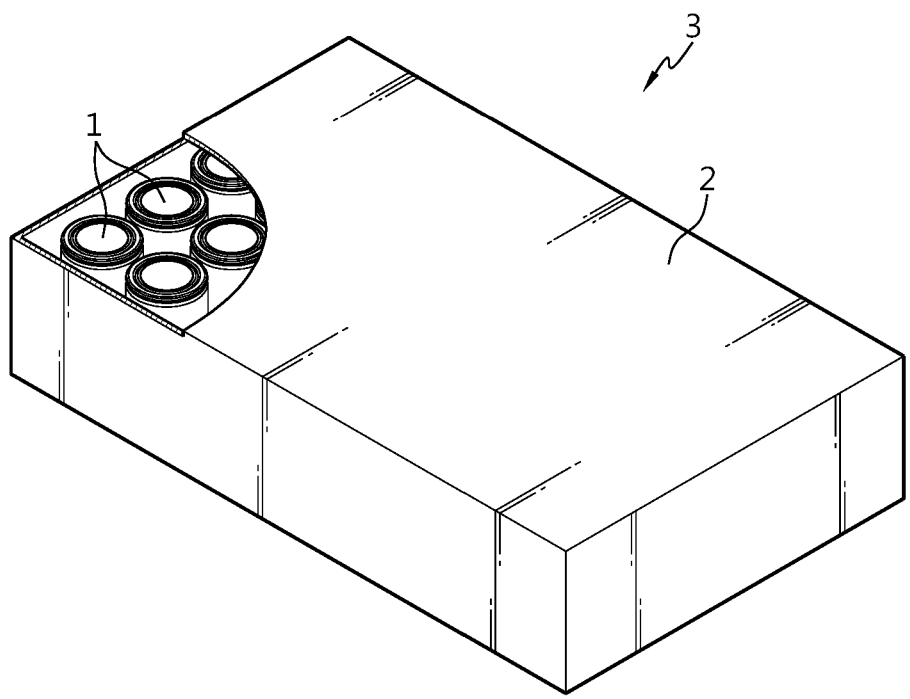
FIG. 11 is a diagram illustrating a battery pack including a battery cell according to an embodiment of the present disclosure.

Referring to FIG. 11, a battery pack 3 according to an embodiment of the present disclosure includes a battery assembly in which a plurality of battery cells 1 according to an embodiment of the present disclosure described above is electrically connected and a pack housing 2 accommodating the same. For convenience of illustration, the components such as a bus-bar for electrical connection, a cooling unit, and power terminals are omitted from the drawings of the present disclosure. That is, the battery pack 3 may further include the elements of the battery pack 3, which are known at the time of filing the present disclosure, such as a BMS, a pack case, a relay, a current sensor, and the like.

Figure 12:
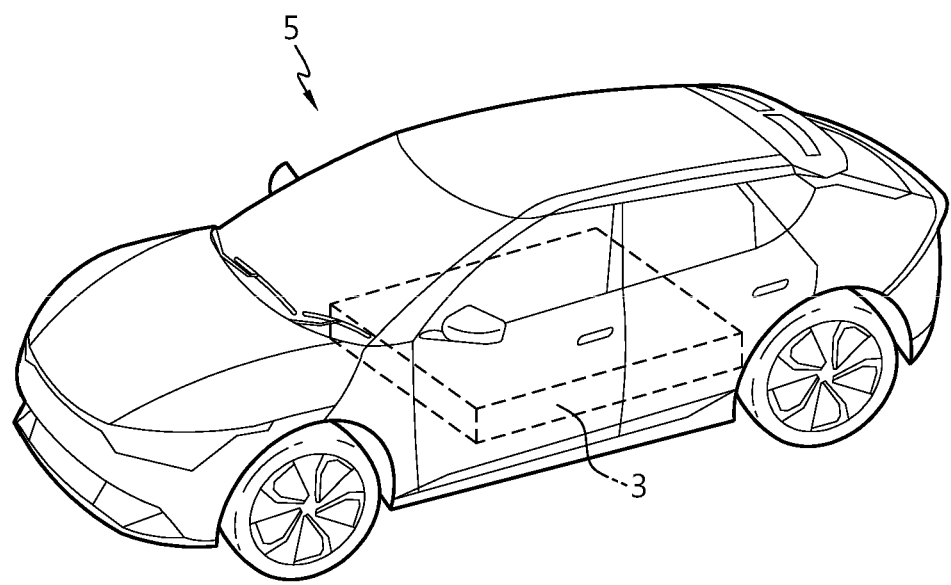
FIG. 12 is a diagram illustrating a vehicle including the battery pack in FIG. 11.

Referring to FIG. 12, a vehicle 5 according to an embodiment of the present disclosure may be, for example, an electric vehicle, a hybrid vehicle, or a plug-in hybrid vehicle, and include the battery pack 3 according to an embodiment of the present disclosure. The vehicle 5 includes a four-wheeled vehicle and a two-wheeled vehicle. The vehicle 5 operates by receiving power from the battery pack 3 according to an embodiment of the present disclosure. The vehicle 5 according to the present disclosure may further include various other elements included in the vehicle 5 in addition to the battery pack 3. For example, the vehicle 5 according to the present disclosure may further include a vehicle body, a motor, a control device such as an electronic control unit (ECU), and the like, in addition to the battery pack 3 according to the present disclosure.

Meanwhile, although terms indicating directions such as upward and downward are used in this specification, it is obvious to those skilled in the art that these terms are only for convenience of explanation and may vary depending on the location of the target object or the location of the observer.

As described above, although the present disclosure has been described with reference to limited embodiments and drawings, the present disclosure is not limited thereto, and various modifications and variations are possible within the technical idea of the present disclosure and the scope of equivalence of the claims to be described below by those skilled in the art to which the present disclosure pertains.

DESCRIPTION OF REFERENCE NUMERALS

5: Vehicle
3: Battery pack
2: Pack housing
1: Battery cell
10: Electrode assembly
20: Battery housing
21: Beading portion
22: Crimping portion
30: Housing cover
31: Venting portion
N1: Upper notched portion
N2: Lower notched portion
G1: Sealing gasket

What is claimed is:
1. A battery cell comprising:
an electrode assembly comprising a first electrode, a second electrode, and a separator interposed therebetween;
a battery housing configured to receive the electrode assembly through an opening formed on one side thereof; and
a housing cover configured to cover the opening and having a venting portion configured to break when internal pressure of the battery housing increases to a predetermined level or more,
wherein the venting portion comprises an upper notched portion provided on an upper surface of the housing cover and a lower notched portion provided on a lower surface of the housing cover,
wherein the upper notched portion and the lower notched portion are provided in a staggered state, and
wherein a width W1 of an entrance of the upper notched portion, a width W2 of an entrance of the lower notched portion, and a distance D2 between a center line of the upper notched portion and a center line of the lower notched portion satisfy the following Equation 1

$$0 < D2 < \frac{W1 + W2}{2}.$$

2. The battery cell according to claim 1, wherein the venting portion has a circular closed loop shape.
3. The battery cell according to claim 1, wherein a center line of the upper notched portion and a center line of the lower notched portion are spaced a predetermined distance apart from each other in a radial direction of the battery cell parallel to a surface of the housing cover.
4. The battery cell according to claim 1, wherein the upper notched portion is disposed more inward than the lower notched portion in a radial direction of the battery cell parallel to a surface of the housing cover.

5. The battery cell according to claim 1, wherein the upper notched portion and the lower notched portion have widths that decrease from a surface of the housing cover towards an inside of the housing cover in a vertical direction of the housing cover perpendicular to a surface of the housing cover.

6. The battery cell according to claim 1, wherein the upper notched portion has an axisymmetric structure having an inclination with respect to a center line of the upper notched portion, and wherein the lower notched portion has an axisymmetric structure having an inclination with respect to a center line of the lower notched portion.

7. The battery cell according to claim 1, wherein the upper notched portion and the lower notched portion together define a first straight line SL that is a virtual straight line passing through a shortest distance between the upper notched portion and the lower notched portion, and a second straight line that is a virtual straight line perpendicular to the first straight line in the longitudinal cross-section passing through a center of the housing cover, and an angle formed between the second straight line and a surface of the housing cover is greater than 0 degrees and less than 90 degrees.

8. The battery cell according to claim 1, wherein the upper notched portion and the lower notched portion are point-symmetrical to each other in a longitudinal cross-section passing through a center of the housing cover.

9. The battery cell according to claim 1, wherein, in a longitudinal cross-section passing through a center of the housing cover, a shortest distance between the upper notched portion and the lower notched portion is greater than a shortest distance between the upper notched portion and the lower notched portion if the upper notched portion and the lower notched portion were disposed at a same position in a radial direction of the battery cell parallel to a surface of the housing cover.

10. The battery cell according to claim 1, wherein, in a longitudinal cross-section passing through a center of the housing cover, a shortest distance between the upper notched portion and the lower notched portion is less than a thickness of the housing cover.

11. The battery cell according to claim 1, wherein the upper notched portion and the lower notched portion at least partially overlap each other in a vertical direction of the housing cover perpendicular to a surface of the housing cover.

12. The battery cell according to claim 1, wherein a shortest distance between the upper notched portion and the lower notched portion is greater than 10% of a thickness of the housing cover.

13. A battery pack comprising at least one battery cell each being the battery cell according to claim 1.

14. A vehicle comprising at least one battery pack each being the battery pack according to claim 13.

* * * * *